J. H. REINHART.
Swinging Gate.
No. 64,034.
Patented April 23, 1867.
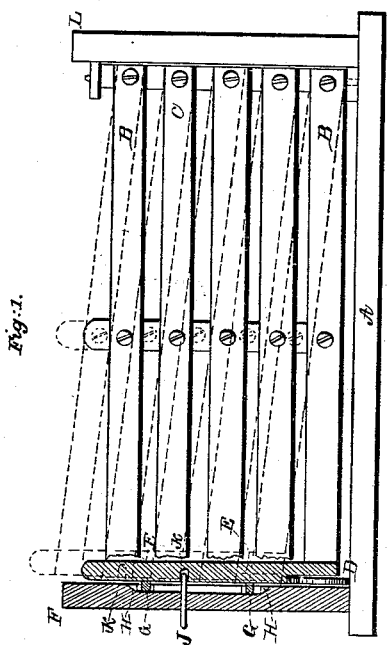
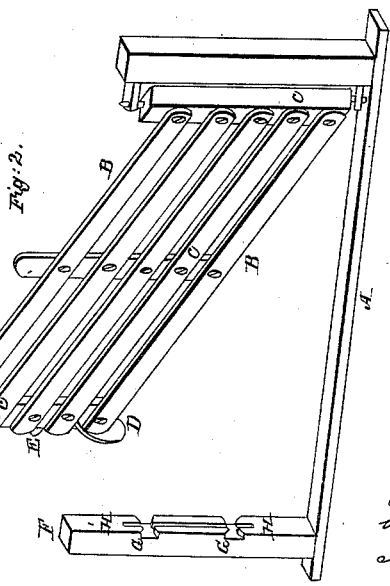

United States Patent Office.

JOHN H. REINHART, OF McKAY, OHIO.

Letters Patent No. 64,034, dated April 23, 1867.

IMPROVEMENT IN FARM GATES.

*The Schedule referred to in these Letters Patent and making part of the same.*

TO ALL WHOM IT MAY CONCERN:

Be it known that I, JOHN H. REINHART, of McKay, Ashland county, State of Ohio, have invented an improved Farm Gate; and I do hereby declare the following to be an exact description thereof, reference being had to the accompanying drawings, and to the letters of reference marked thereon, making a part of this specification, in which—

Figure 1 represents the gate when closed.

Figure 2, when partly open.

The nature of my invention consists in the projections at the front end of gate with the adjustable bolt, and pivot-wheel, and slotted post, as arranged and combined.

A represents the surface of the ground, B the rails of the gate set on screw-pivots C, so as to raise or lower; D, a small wheel attached to the front lower corner of the gate, so as to enable the gate, when opening or closing, to adapt itself to the unevenness of the ground. E E are projections on the front end of the gate, that are intended to enter the gate-post F at the cross slots G G, and to move up and down in the vertical slot H. J is an adjustable or movable bolt, that is passed through the post F, and enters the apertures K K that are in the front end of the gate. The upper aperture K allows the gate to rest close and near to the ground, but the lower aperture K that the gate may be slightly raised in front, so that poultry or pigs may pass under when desired. The gate swings on an ordinary pivot hinge attached to the rear post L.

What I claim as my invention, and desire to secure by Letters Patent, is—

The arrangement, construction, and combination of the wheel D, movable bolt J, and projections E E, so that the gate operates in the slots G and H of the post F, as herein described and for the purposes set forth.

JOHN H. REINHART.

Witnesses:
J. FRANKLIN REIGART,
EDM. F. BROWN.